Fig.1

July 23, 1935.  A. B. SCOTT  2,008,878
PROJECTION MACHINE
Filed May 7, 1932  6 Sheets-Sheet 2

Inventor
Albert B. Scott
By Lyon & Lyon
Attorneys

July 23, 1935. A. B. SCOTT 2,008,878
PROJECTION MACHINE
Filed May 7, 1932 6 Sheets-Sheet 4

Inventor
Albert B. Scott.
By Lyon & Lyon
Attorneys

July 23, 1935. A. B. SCOTT 2,008,878

PROJECTION MACHINE

Filed May 7, 1932 6 Sheets-Sheet 6

Inventor
Albert B. Scott
By Lyon & Lyon
Attorneys

Patented July 23, 1935

2,008,878

UNITED STATES PATENT OFFICE 2,008,878

PROJECTION MACHINE

Albert B. Scott, Los Angeles, Calif., assignor of one-third to J. Rex Cole and one-third to Henry King, both of Los Angeles, Calif.

Application May 7, 1932, Serial No. 609,867

10 Claims. (Cl. 88—16.2)

This invention relates to motion picture projecting apparatus of the type disclosed in my application, Serial No. 536,352, "Projecting apparatus", filed May 11, 1931.

In this type of machine a continuous web is employed and the magazine has a special construction enabling the film to be continuously fed into it and continuously removed, to be fed past the projecting apparatus.

The general object of this invention is to provide a projection machine of this type having improved means for effecting the purposes of the device.

The projection apparatus is intended to be used particularly for showing pictures in connection with a motion picture theater to display part of the films of attractions that are now playing and attractions which are coming to the theater. In my former application, referred to above, an automatically controlled sign is employed, controlled by the film itself, to indicate whether the pictures being projected by the film are now showing in the theater or will play there in the future. This control by the film is obtained by providing a notch at the edge of the film which controls a switch. This switch, in one position, passes current through a sign with the words "Now Showing" and in another position passes a current through another sign, "Coming Attractions".

In this apparatus, I prefer to employ three projecting devices which project pictures in different directions, respectively, and the film is drawn through the film guides of the three projecting devices in succession. This subjects the film to considerable tension and there is, therefore, a possibility of breaking the film on this account.

One of the objects of my invention is to provide automatic means for opening the complete circuit through the lamps, the sound reproduction apparatus, the signs and through the motor that drives the machinery of the apparatus in case the film should break, and to provide connections between all the fire doors mounted in front of each lamp to close the fire doors automatically when the driving mechanism stops. In the preferred embodiment of the invention, a sound reproduction device is employed, which receives the film after it passes the projection device, and one of the objects of my invention is to provide a tension device for maintaining the film in tension as it passes the sound reproduction device and to utilize this tension device for controlling the switch referred to above, that will open all the electric circuits through the apparatus in case of a breakage of the film.

Further objects of the invention will appear hereinafter.

The invention consists in the novel parts and combinations of parts to be described hereinafter, all of which contribute to produce an efficient projection machine.

A preferred embodiment of the invention is described in the following specification, while the broad scope of the invention is pointed out in the appended claims.

Figure 1:
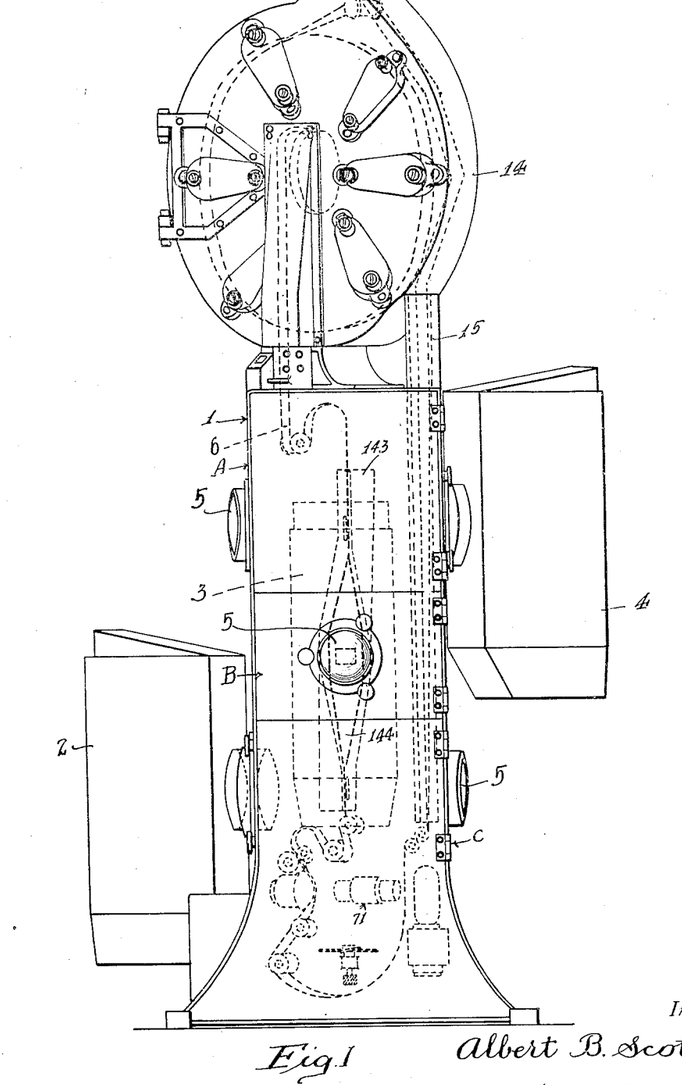
Figure 1 is a side elevation of a projection apparatus embodying my invention and illustrating in dotted lines the continuous film and showing its course through the machine.
Figure 2:
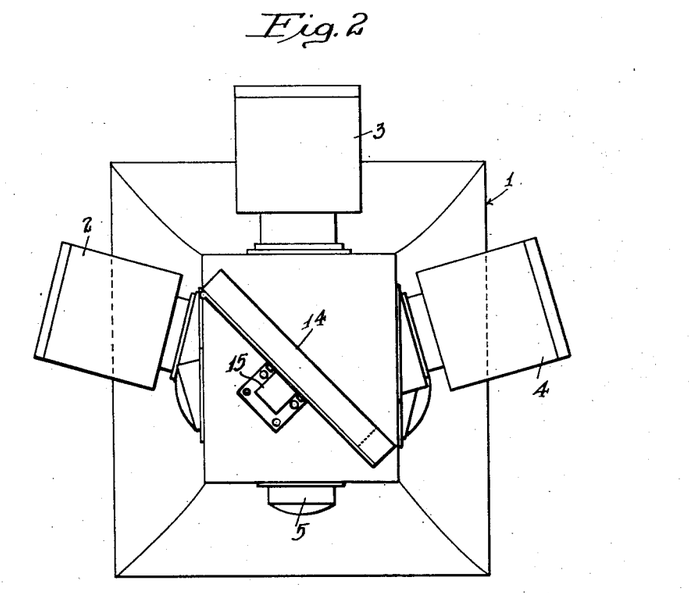
Figure 2 is a plan of the machine shown in Figure 1.
Figure 3:
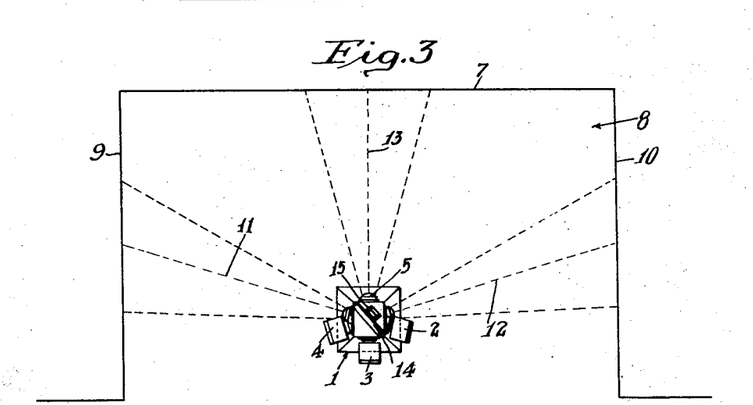
Figure 3 is a diagrammatic view upon a greatly reduced scale, and illustrating a manner in which the apparatus adapts itself for projecting pictures onto three screens in a marquee.

Before proceeding to a more detailed description of the invention, it should be said that Figs. 1, 2 and 3 illustrate a type of machine in which the axes of projection of the two opposed projection devices make an oblique angle with each other so as to facilitate projecting pictures onto two end screens of a marquee, as illustrated in Fig. 3.

Referring particularly to Fig. 1, in this type of machine I provide a vertical casing 1, with which are mounted three projecting devices, which will be described more fully hereinafter and which employ three lamps 2, 3 and 4 (see Fig. 2), which cooperate with oppositely disposed lenses, such as the lens 5, to project pictures onto three screens.

In the operation of the machine, the film 6 (see Fig. 1) is drawn in succession through the film guides of three different projection devices A, B and C. In Fig. 3, 7 indicates the outer face or wall of a marquee 8, and 9 and 10 indicate the two end walls of the marquee. The lines 11 and 12 indicate the axes of projection of two of the projection devices, and line 13 indicates the axis of projection of the third projection device. It will be noted that two of the projection devices are mounted so that their axes of projection, namely, the lines 11 and 12, form an oblique angle with each other, which angle is bisected by the axis of projection 13. By reason of this arrangement of the axes of projection, I am enabled to place the casing 1 at an increased distance from the outer side 7 of the marquee. Of course, this necessitates projecting the pictures at the ends of the marquee in a slightly inclined or oblique direction, but the incidental aberration of the image on the screen is so slight as to be of little consequence, and, if it is necessary, the screen at the ends 9 and 10 of the marquee can be slightly tilted from the plane of the end face of the marquee to overcome this aberration.

Referring, again, to Fig. 1, the casing 1 is surmounted by a film magazine 14, which may be constructed like the film magazine in my application, Serial No. 536,352, referred to above, but in the present improvement this magazine is preferably mounted in an inclined position, as this facilitates the withdrawal of the film from the center of the magazine, and passing the film thereafter through the projection devices with a minimum of twist in the film before it reaches the first projecting device. In other words, 45° of the necessary twist in the plane of the film is already given to the film when it is drawn off from the magazine. This specific construction of the mechanism employed in the magazine 14 forms the subject-matter of another copending application.

As the film is drawn off from the center of the magazine 14, it passes down a guide duct 15 into the upper part of the casing.

Figures 11, 12, 13, 14:
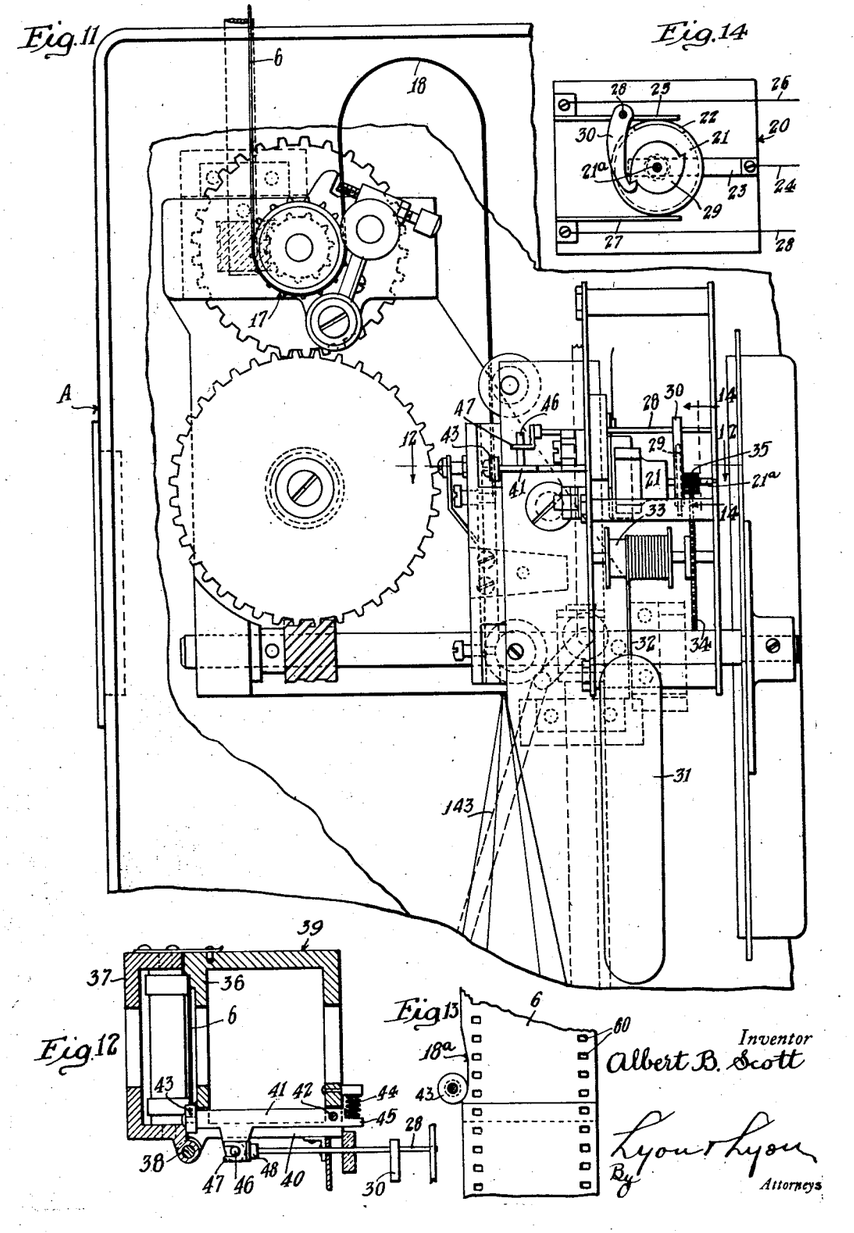
Figure 11 is a vertical section through the upper portion of the machine and showing in side elevation the sign switch which is controlled by a notch in the edge of a film. This view also illustrates an escapement controlled by the film notch for throwing this switch.
Figure 12 is a horizontal section, taken about on the line 12—12 of Figure 11, to further illustrate the arrangement of the control mechanism for the sign switch, certain parts being broken away.
Figure 13 is a diagrammatic view illustrating a portion of the film, with the notch in the film cooperating with a roller of the control mechanism to throw the sign switch.
Figure 14 is a vertical section, taken about on the line 14—14 of Figure 11, and further illustrating details of the sign switch and means for controlling the same.

Referring to Fig. 11, in this view 6 indicates the film. This film passes to a feed device 17, which is driven by the mechanism of the apparatus, beyond which the film passes upwardly to form a loop 18 before it passes down through the uppermost projecting device A. As stated above, the film 6 is a continuous or endless film, and a portion of the pictures on it represent attractions now playing in the theater and another portion represents coming attractions. The two film portions are pieced together, as indicated in Fig. 13, and at or about the points where they are connected together a notch 18a is formed in the edge of the film. When either notch arrives at the projection device A, it automatically effects the throwing of a sign switch of the type described in my prior application, referred to above, to correspond with the section of film that will then pass the projection apparatus.

In Fig. 14, I illustrate the sign switch 20, which preferably consists of a rotary disc 21 having a contact 22, which is mounted on the insulating body of the disc 21, and this rotary contact is in metallic contact with the terminal 23, to which a circuit wire 24 supplies current. In one position of the switch, this contact 22 is in engagement with a fixed contact 25 that is connected by wire 26 with one of the signs, and in the other position of the switch contact 22 is in engagement with a fixed contact 27 which connects to a wire 28 leading to the other sign. When the notch 18a arrives at the projection apparatus A (Fig. 11), it controls a mechanism that effects the rotation of a rock shaft 28, thereby releasing a ratchet wheel 29 (Fig. 14) rigid with the switch member 21, from a detent pawl 30, and thereby permitting the switch to make a half revolution. Any suitable means may be employed to cause the switch to make this half revolution. In the present instance, this is accomplished through the medium of a weight 31 (Fig. 11) suspended on a cord 32 that coils on a drum 33, said drum having a large gear wheel 34 rigid therewith and meshing with a pinion 35 on the shaft 21a (Fig. 14) of the rotary switch member 21.

The means for actuating the detent pawl 30 will now be described. The film 6 passes down through a film guide 36 (see Fig. 12), having a cover 37 mounted on a vertical hinge 38. This guide includes a housing 39 for a fire box door, not illustrated in Fig. 12. In the wall 40 of the film guide, I provide a slot, in which is mounted a lever 41 to swing on a pivot pin 42 so that the lever has a limited swinging movement in a plane at right angles to the plane of the film. The end of this lever is provided with a roller 43 that is pressed lightly against the edge of the film through the medium of a coil spring 44, which thrusts against a toe or short arm 45 on the lever. Alongside of the wall 40 and on its outer side an upwardly projecting pin 46 is provided (see Fig. 11), and this pin is received between the forks of a yoke 47, which yoke is formed on the end of a short arm 48 that is rigidly attached to the shaft 28. With this construction and arrangement of parts, it will be evident that when the notch 18a (Fig. 13) arrives at the roller 43, the roller will move into the notch, thereby rocking the pawl 30 (Fig. 14) away from the ratchet wheel 29 for the instant; but, as soon as the notch has passed by, the pawl will move back again into the path of the diametrically opposite detent tooth of the ratchet. In this way, the contact 22 will first engage the first contact 25 and then the contact 27, and such alternate engagement will continue. In this way, the current will be switched first through the sign indicating "Coming Attractions" and then through the sign "Now Playing" to correspond with the pictures that are being shown from the film at any particular moment.

The tension means for the sound production device and the main switch controlled thereby will now be described, together with the feeding mechanism which draws the film past the different projection devices.

Figures 9, 10:
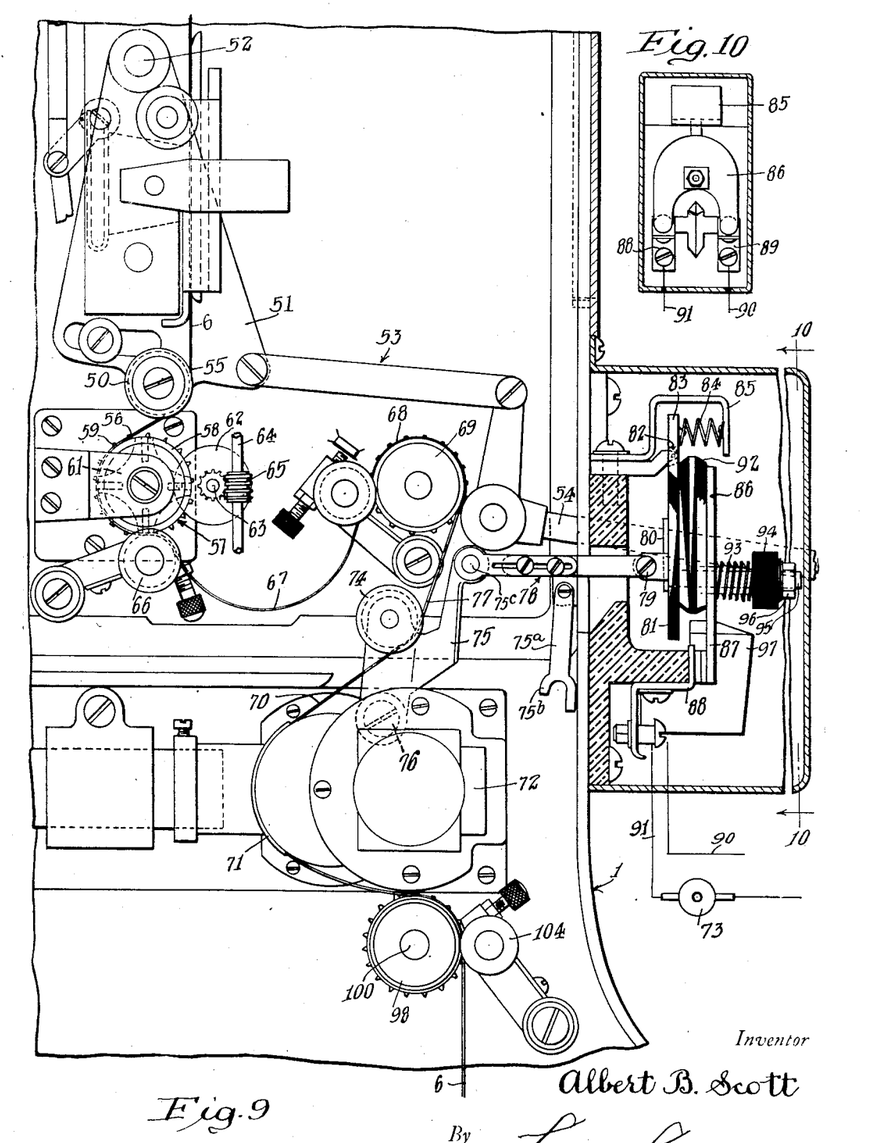
Figure 9 is a vertical section upon an enlarged scale, and particularly illustrating the feeding mechanism for the film, and also illustrating the tension device that maintains the film in tension as it passes the sound production device, and the manner in which this tension device opens the main switch to the apparatus if the film breaks.
Figure 10 is a vertical section on the line 10—10 of Figure 9 upon a reduced scale, and particularly illustrating the switch shown in Figure 9.

Referring particularly to Fig. 9, when the film passes down from the lowest projection device C, it passes around the usual guide roller 50 on a "framing" device 51. This "framing" device is in the form of a plate pivoted at 52, the position of which is controlled by a link 53, which is controlled by a lever 54 on the outside of the casing. By changing the position of this roller 50, a loop 55 in the film can be altered so as to raise or lower the "frames" or pictures when they are opposite the lenses. Below the framing roller 50, the film passes in a loop 56 around a feed spool or roller 57, having the two sprocket wheels 58 with teeth 59 that engage the usual perforations 60 near the edge of the film (see Fig. 13). This feed roller 57 (Fig. 9) is actuated with a step-by-step movement through the medium of a Geneva stop movement, including a driven wheel 61 on the shaft of the feed roller 57 driven by a driving wheel 62 on a counter-shaft 63, which countershaft is driven continuously from the main driving shaft 64 of the machine through spiral gears 65.

On the underside of the feed roller 57 a presser roller 66 is provided, and this roller 66 cooperates with the "frame" roller 50 to give a considerable arc of contact between the film and the sprocket wheels 58. In the present instance, this arc is approximately 180°, and this insures that a considerable number of sprocket teeth will be in engagement with the film, thereby reducing the strain on the edges of the film at each perforation. This is desirable because, by reason of the fact that the film 6 is being pulled through three film guides, it offers considerable resistance to the feeding movement. In this connection, it should be said that in projection machines, as usually constructed, the film would be guided down the right-hand face of the feed roller 57, being held against the same by two presser rollers. According to my invention, I dispense with these presser rollers, but reverse the direction of rotation of this feed roller 57 and form a real loop in the film passing completely around one side of the feed roller.

From the presser roller 66 the film hangs in a loop 67 (see Fig. 9) and from this point the film passes upwardly and forms a loop 68 passing over the upper side of a feed roller or loop roller 69. This loop roller 69 is driven off shaft 64 and the film which passes down from it forms a loop 70 passing through the guide 71 of a photoelectric cell and optical unit 72 having its own lamp 72a.

This photoelectric cell 72 may be of any desired construction and is provided with wiring, not illustrated, that connects it with loud speakers or other sound transmitting devices. The tension in the film between the guide 71 and the roller 69 is maintained by a tension device which controls the main switch for all the electric apparatus including the motor 73 that drives the mechanism of the apparatus. This tension device may have any desired construction, enabling a roller, such as the roller 74, to be pulled against the film so as to develop slight tension in the film. Cooperating with this roller and tension device a main switch is provided with spring means for maintaining it closed regardless of changes of position of the tension device when the amount of slack in the film varies; and these parts cooperate to open the switch automatically if the film breaks, thereby giving free movement of the tension device away from its normal position. In the present instance, the tension device includes an arm 75 mounted on a fixed pivot 76 and carrying the roller 74, which pulls a "flat" loop 77 in the film just before the film passes the photoelectric cell 72. The lever 75 has an upwardly projecting arm that connects to an adjustable link 78, the outer end of which is attached by a pivot screw 79 to a plate 80, and this plate is secured on an insulating block 81 that is suspended on a horizontal pivot 82. The insulating block 81 has an extension 83 which projects above the pivot 82, and at this point a compression spring 84 is provided that thrusts against a bracket 85 at its outer end, and at its inner end against the extension 83. This spring assists another spring, to be presently described, in providing tension in the tension device to hold the roller 74 pressed resiliently or yieldingly against the film at the loop 77. The outer face of the insulating block 81 carries a metal contact plate 86 having two forks 87 (see Fig. 10) which project downwardly and which normally engage two fixed contacts 88 and 89 so as to bridge the same and carry current from a wire 90 to a wire 91. These wires 90 and 91 are in the main circuit for the electric apparatus including motor 73, as indicated diagrammatically in Fig. 9. The contact plate 86 is loosely mounted on the outer side of the block by means of a spur 92 at its upper end that is received in a small socket formed in the outer face of the block. In order to enable the forks 87 to be pressed yieldingly against the fixed contacts 88 and 89, I prefer to mount the contact plate 86 so that it is pressed yieldingly against the block by holding means in the form of a coil spring 93. This spring is received over an insulating bushing 94 that is carried by the block and through which passes a bolt 95 that is carried by the plate 80, the outer end of this bolt being provided with an adjusting nut 96 that seats up against an insulating block 97 that slides on the bushing. Evidently, by tightening up on this nut 96, the tension on the spring 93 can be increased.

It should be understood that the film is drawn down and passed through the photoelectric cell 72 by a feed device, which will presently be described, so that there is always tension maintained in the loop 77. If the film should break at any point, this tension would, of course, be immediately relieved and the spring 84 would then swing the insulating block 81 toward the right, as viewed in Fig. 9, thereby moving the forks 87 away from the fixed contacts 88 and 89 which would open the circuit through all the apparatus and stop the motor.

Figures 7, 8:
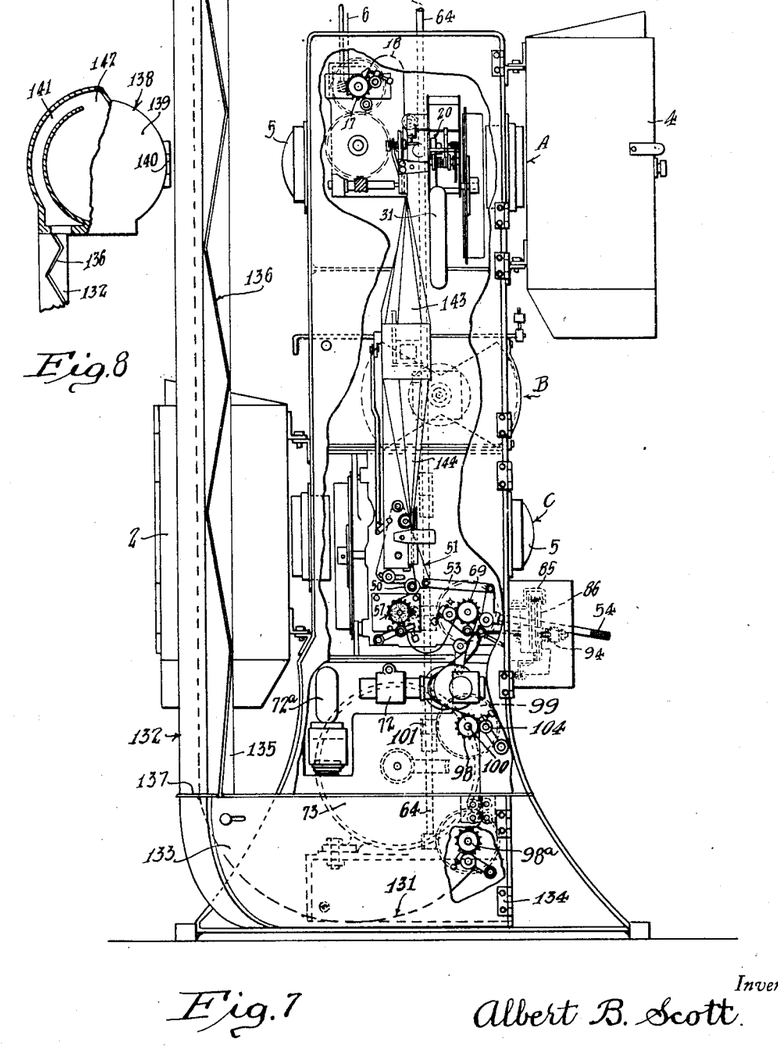
Figure 7 is a side elevation of the casing, with the front doors broken away so as to disclose the general arrangement of the apparatus within the casing. This view illustrates the right angle arrangement for the projection devices in correspondence to Figures 4 and 5.
Figure 8 is a front elevation of the film magazine showing a portion of the magazine door broken away, and particularly illustrating how the magazine cooperates with the film chute or guide to facilitate the threading of a continuous film into the machine.

From the sound controlling device or photoelectric cell 72 the film passes downwardly over a feed roller 98 (see Fig. 9), which is driven at a uniform speed by a spiral gear 101 on shaft 64, meshing with a spiral gear 99 on the shaft 100 (see Fig. 7). The film passes over the upper side of the feed roller 98 and is held against the side face of the roller by presser roller 104.

The fire door control will now be described. Corresponding to each of the projection devices, a fire door housing is provided similar to the fire door housing 39 (see Figs. 11 and 12). In each of these housings a fire door is provided. The uppermost fire door 105 (see Fig. 5) is supported on a horizontal shaft 10. A similar shaft 108 is provided, which extends at right angles to the direction of the shaft 06 for carrying the intermediate fire door 109, which corresponds to the intermediate projection device, and a lower fire door shaft 110 is provided corresponding to the lowest projection device, and carrying a fire door 111, indicated in dotted lines in Fig. 5.

Figures 4, 5, 6:
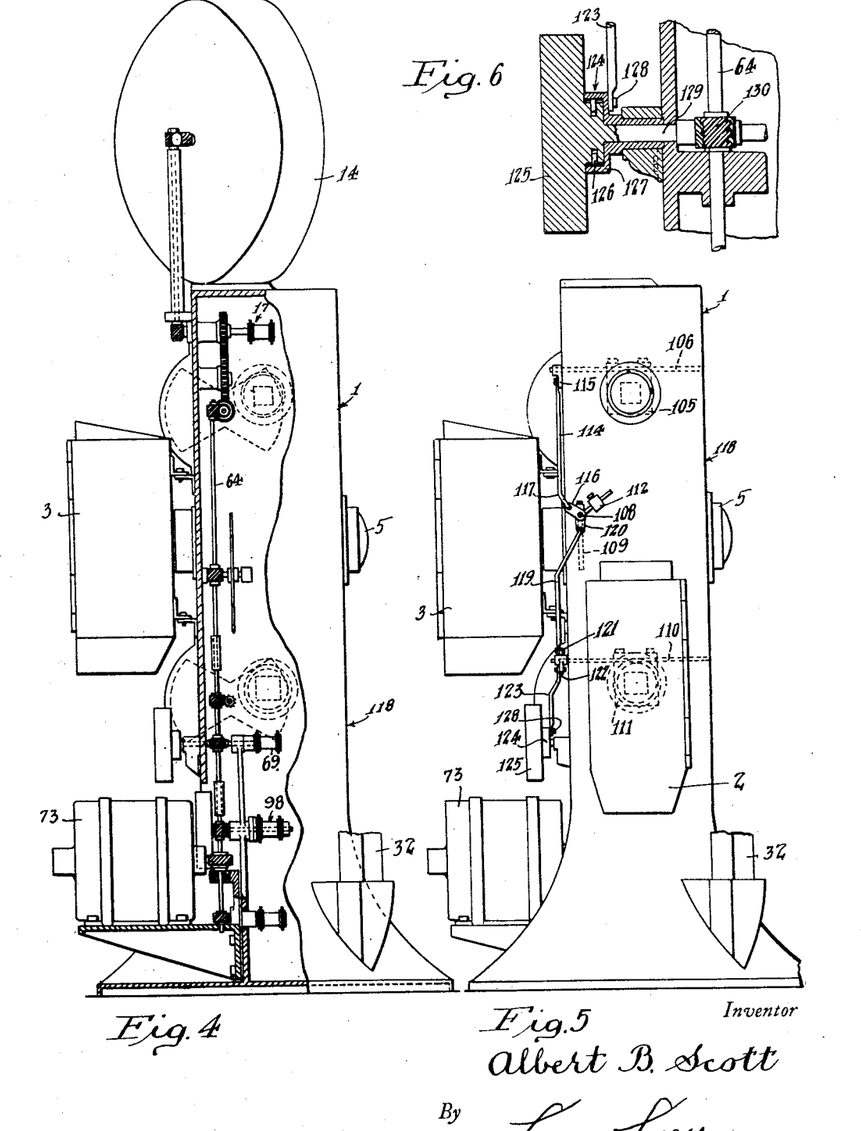
Figure 4 is a side elevation of a machine with certain parts broken away, and particularly illustrating the driving mechanism and the motor. This view, however, illustrates an embodiment of the machine in which two of the projecting devices project the pictures on parallel axes one above the other, and the other projecting device projects its pictures on an axis at right angles to the plane passing through the axes of projection of the other two devices.
Figure 5 is a side elevation of the casing of a machine with certain parts omitted, and particularly illustrating the arrangement of the fire doors and the fire door control mechanism which connects them.
Figure 6 is a vertical section, taken through a friction clutch, which is common in machines of this type, for controlling the fire door.

The shaft 108 is preferably provided with a counterweight 112 that automatically closes the fire doors 105, 109, and 111 when the machine is not running. The single counterweight 112 is of sufficient weight to close all of the fire doors. I provide connections between the three shafts 106, 108 and 110 so that all the fire doors are controlled in unison. For this purpose, I provide a link 114 which connects lever arm 115 on the shaft 106 with a lever 116 on the shaft 108. This link 114 is provided with a bend 117, which enables it to pass around the corner of the casing 118 of the machine, as illustrated in Figs. 4 and 5. A similar bent link 119 is provided that connects an arm 120 on the shaft 108 with an arm 121 on the shaft 110. The shaft 110 is provided with another arm 122 that is connected to an actuating link 123 which connects to a friction clutch 124 (Fig. 6), so that when the machine is running, a force will be developed in the link 123 that will hold all of the fire doors open. This clutch illustrated in Fig. 6 is of a common type and is formed on the hub of a flywheel 125, said hub being provided with small radially guided plungers 126, the outer ends of which, acting centrifugally, thrust against the flange of a small wheel 127. To the disc of this wheel 127 the link 123 is attached by a pin 128. The shaft 129 of this flywheel is driven continuously from the shaft 64 through spiral gears 130.

The construction of the apparatus which facilitates the placing of an endless film in the machine will now be described, referring particularly to the type of machine illustrated in Figs. 7 and 8.

In this type of machine, after the film passes down from the feed roller 98a, it hangs in a loop 131 (Fig. 7) from which the film passes upwardly through a guide chute or duct 132. At this point, the front of the casing is provided with a swinging door 133, the hinges 134 for which are located on the opposite side of the casing from the film duct 132. The film duct 132 is preferably of square cross-section, and one of its side-walls 135 is provided with a slot which is so placed that when the film is in the duct, it will not be possible for the film to come out through the slot. In the present instance, I prefer to provide a zig-zag slot 136 passing from one end of the duct to the other. This slot, at its lower end, continues into a horizontal plate 137 which may form a support for the lower end of the duct 132 at the base of the machine. In other words, the construction is such that when the door 133 is open the lower end of the zig-zag slot 136 will be open at the plate 137. This enables the film to be shoved laterally through the zig-zag slot into the duct 132. A similar arrangement to this is employed at the upper end of the casing (see Fig. 8). In other words, the magazine 138 is provided with a cover 139 having a hinge 140 at one side of the magazine and remote from a curved inlet duct 141 which guides the film around to the upper side of the magazine where it passes on to the roll of film in the magazine through an inlet opening 142. As indicated in Fig. 8, this zig-zag slot 136 extends up to the underside of the magazine 138, at which point this slot is open.

Hence, after the film has been threaded through the entire length of the duct 132, its upper portion can be introduced by lateral movement into the curved inlet duct 141 while the coil of the film is being set up in the magazine. In passing down from the upper projection apparatus, the film passes through a twisted guide 143 (see Fig. 7) that turns the film through 90° so that it will pass through the film guide of the projection apparatus B. From this point the film passes down through another twisted guide 144 that twists it through another 90° to put the film in the proper plane to pass through the film guide of the projection apparatus C. In a machine of the type shown in Fig. 1, of course, the film will have to be twisted through an angle of more than 90°, depending on the angle between the axes of projection of the different projection devices.

In order to enable the switch at 86 (Fig. 9), to be held closed at will when desired, and when there is no film running past the roller 74, I provide a pivotally supported strut 75a that has a fork 75b at its lower end. This strut may be swung up by hand when desired and its fork 75b engaged with pivot pin 75c (that connects parts 75 and 78) so as to replace the film tension as a means for holding back the tension link 78.

The general mode of operation of the apparatus will now be described.

The principal portion of the film 6 is carried in a coil in the magazine 14, in the manner disclosed in my prior pending application, already referred to, or in my co-pending application Ser. No. 536,352. The film is drawn off through the film guide 15 (see Fig. 1) by feeding mechanism 17 (see Fig. 11), which pulls the film down and forms a loop from which the film passes downwardly through the projecting device, or projecting devices, mounted in the casing. In the present instance, this film is drawn past three projection devices which project the pictures in different directions. When the notch 18a arrives at the roller 43, it permits spring 44 to rock the lever 41 inwardly, and this, through the agency of pin 46, rocks the arm 48 and thereby rocks the shaft 28 of the detent pawl 30. This momentarily releases a tooth of the ratchet wheel 29 (see Fig. 14) and permits a rotation of the movable contact member 22 of the sign switch. This gives a half revolution of the switch through the operation of the weight 31, which descends through a short distance and imparts movement to the switch member 21 through the gear 34 and pinion 35. In the position shown in Fig. 14, the current is flowing through the contact 25, but as soon as the switch is actuated it will bring contact 22 into engagement with the contact 27 and put the current through the other sign. In this way, a sign bearing the legend "Now Playing" can be alternated with the sign bearing the legend "Coming Attractions".

From the uppermost projection apparatus A (see Fig. 11), the film passes downwardly so as to move past the intermediate projection apparatus; in passing down, the film is twisted through an angle so as to enable the intermediate projection device corresponding to the lamp 3 to project its pictures in a different direction from the uppermost projection apparatus. From this point, the film passes on down through the lowest projection apparatus and arrives at the "framing" device 51 (see Figs. 7 and 9). The film is pulled down past the different projection devices by the feed roller 57 (see Fig. 9), which advances the film in the step-by-step movement customary in projection machines. Beyond this point a loop 67 is formed, from which the film passes in a loop 68 over driven sprocket 69, which operates to place a slight tension in the film in a flat loop 77 where the film passes down to the optical unit and protoelectric cell 72. The spring 93 exerts its force against the part 94 to pull the tension device in the tensioning direction and presses at its other end against the movable switch member so as to maintain the switch closed regardless of changes of position of the tension device when the amount of slack in the film varies, but if the film should break, the tension in the flat loop 77 is relieved and the spring 84 and spring 93 then pushes the insulating block 81 toward the right, as viewed in Fig. 9, and cooperate to move the contact plate 86 away from the fixed contacts 88 and 89, thereby opening the circuit through the circuit wires 90 and 91 that connect to all the electric apparatus including the motor 73. This will stop the operation of the machine and extinguish all lamps.

Stopping the drive of the machine will automatically close all the fire doors 105, 109 and 111 (see Fig. 5) by reason of the fact that the clutch 124 will no longer exert a force in the connecting link 123. The counterweight 112 for the fire doors will then close them and prevent any possibility of the film catching fire from the lenses.

In threading the film into the guide chute 132 (Figs. 7 and 8) that guides the film upwardly, the door 133 at the bottom of the casing is opened, and so is the door 139 of the magazine at the upper end of the casing. When these doors are open, the film can be threaded laterally through the zig-zag slot 136 into the chute or duct 132.

It is understood that the embodiment of the invention described herein is only one of the many embodiments this invention may take, and I do not wish to be limited in the practice of my invention, nor in my claims, to the particular embodiment set forth.

What I claim is:

1. In a motion picture projecting and sound-reproducing apparatus, the combination of a photo-electric cell with guiding means for guiding a film past the same, a tension device having a roller for engaging the film, an electric circuit for the apparatus, a relatively fixed contact and a relatively movable contact in said circuit, spring means exerting force upon the tension device to press the roller against the film and maintain the film in tension as it passes through the guiding means, and also exerting force upon the relatively movable contact to hold the same in engagement with the relatively fixed contact, said spring means operating to disengage the relatively movable contact from the relatively fixed contact when the film breaks.

2. In apparatus of the kind described, the combination of a casing, means for guiding a film through the casing, a motor for driving the film, a tension device having a roller engaging the film, a switch associated with the tension device and including a movable switch member and a relatively fixed switch member, a controlling circuit for the motor passing through the said switch, a spring exerting force at one of its ends on the tension device to hold the roller against the film and maintain tension therein, and exerting its force at its other end on the movable contact to maintain it against the relatively fixed contact, and a second spring operating to separate the contacts when the film is broken.

3. In apparatus of the kind described, the combination of a casing, means for guiding a film through the casing, a motor for driving the film, a tension device having a roller engaging the film, a switch associated with the tension device and including a movable switch member and a relatively fixed switch member, a controlling circuit for the motor passing through the said switch, a spring exerting force at one of its ends on the tension device to hold the roller against the film and maintain tension therein, and exerting its force at its other end on the movable contact to maintain it against the relatively fixed contact regardless of changes of position of the tension device when the slack in the film varies at the tension roller, and means operating to separate the contacts when the film is broken.

4. In apparatus of the kind described, the combination of means for guiding a film, a tension device having a roller engaging the film, a switch associated with the tension device and including a movable switch member and a relatively fixed switch member, a spring exerting force in one direction against the tension device to hold its roller against the film and exerting its force in the other direction against the movable contact to hold the same against the relatively fixed contact and to permit changes in position of the tension device without separating the contacts.

5. In apparatus of the kind described, the combination of means for guiding a film, a tension device having a roller engaging the film, a switch associated with the tension device and including a movable switch member and a relatively fixed switch member, a spring exerting force in one direction against the tension device to hold its roller against the film and exerting its force in the other direction against the movable contact to hold the same against the relatively fixed contact and to permit changes in position of the tension device without separating the contacts, and means cooperating with the other parts when the film breaks, to separate the movable contact from the fixed contact.

6. In a motion picture projecting apparatus, the combination of means for guiding the film, a photoelectric cell having a guide for the film, an electric motor with means actuated thereby for advancing the film, a movable tension member having a roller for engaging the film to maintain the same in tension at the guide, a movable switch member connected with the tension member, relatively fixed contact means to cooperate with the movable switch member, a spring mounted so as to urge the roller in a direction to maintain the film in tension, and holding means for normally holding the movable switch member yieldingly in contact with the relatively fixed contact means, said spring operating to overcome the force exerted by said holding means and actuate the movable switch member to open the electric circuit upon breakage of the film.

7. In a motion picture projecting and sound reproduction apparatus, the combination of means for guiding the film, an electric motor with means actuated thereby for advancing the film, a photo-electric cell having a guide for the film, a movable tension member having a roller for engaging the film to maintain the same in tension at the guide, a rock-plate connected with the tension member, resilient means for urging the rock plate and the tension member in a direction to maintain tension in the film, a movable contact member, relatively fixed contact means for cooperating with the movable contact member to close the electric circuit through the apparatus, and means for normally holding the relatively movable contact member yieldingly in engagement with the relatively fixed contact means, said resilient means operating upon a breakage of the film, to swing the rock plate and separate the movable contact member from the relatively fixed contact means and thereby open the circuit.

8. In a motion picture projecting and sound reproduction apparatus, the combination of means for guiding the film, an electric motor with means actuated thereby for advancing the film, a photo-electric cell having a guide for the film, a movable tension member having a roller for engaging the film to maintain the same in tension at the guide, a pivotally mounted rock plate connected with the tension member, a spring for urging the rock plate in a direction to maintain tension in the film, an insulating block supported on the rock-plate, a relatively movable switch member supported on the insulating block, relatively fixed contact means, a spring associated with the relatively movable contact member for normally holding the same yieldingly against the relatively fixed contact means, said first named spring operating upon a breakage of the film, to swing the rock-plate and separate the contacts to open the circuit.

9. In a motion picture projecting and sound reproduction apparatus to operate with a film, a plurality of projection devices for projecting pictures from the film and including film guides corresponding to the same, through which the film passes in succession, a photoelectric cell with means for guiding a film past the same, a portion of said guiding means being located beyond the projection devices and before the photo-electric cell with respect to the direction of advance of the film, a continuously driven loop roller carrying a loop of the film from which the film passes to the photoelectric cell, a feed roller with means for actuating the same with a step-by-step movement to draw the film past the projection devices and cooperating with the loop roller to maintain a loop in the film, means for guiding the film around the face of the feed roller remote from the said loop roller, and means for guiding the film around the upper side of the loop roller.

10. In a motion picture projecting and sound reproduction apparatus to operate with a film, a plurality of projection devices for projecting pictures from the film and including film guides for guiding the film past the said projection devices in succession, a photoelectric cell with means for guiding the film past the same and located beyond the projection devices with respect to the direction of advance of the film, a continuously driven loop roller carrying a loop of the film from which the film passes to the photoelectric cell, a feed roller with means for actuating the same with a step-by-step movement to draw the film past the projecting devices and cooperating with the loop roller to maintain a loop in the film, means for guiding the film around the face of the feed roller remote from the said continuously driven loop roller, the film guide for the projecting device adjacent the feed roller and the feed roller cooperating to maintain a frame loop between the same, and a framing device having a roller engaging the framing loop between the last-named film guide and the feed roller, and pressing the film in a direction to hold the same on the face of the feed roller.

ALBERT B. SCOTT.